(12) United States Patent
Makimura

(10) Patent No.: US 7,987,607 B2
(45) Date of Patent: Aug. 2, 2011

(54) INCLINATION SENSOR

(75) Inventor: Yuji Makimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 12/917,069

(22) Filed: Nov. 1, 2010

(65) Prior Publication Data
US 2011/0041350 A1 Feb. 24, 2011

Related U.S. Application Data

(63) Continuation of application No. 12/085,328, filed as application No. PCT/JP2006/323088 on Nov. 20, 2006, now Pat. No. 7,845,086.

(30) Foreign Application Priority Data

Nov. 21, 2005 (JP) ................................. 2005-335589

(51) Int. Cl.
G01C 9/10 (2006.01)
(52) U.S. Cl. ...................................... 33/365; 33/366.16
(58) Field of Classification Search .................... 33/365, 33/366.16, 366.23, 366.11, 366.12, 366.14, 33/366.18, 366.22, 366.24, 366.26, 366.27, 33/391, 395, 401, 402
See application file for complete search history.

(56) References Cited

U.S. PATENT DOCUMENTS

| 6,647,634 | B2 | 11/2003 | Yang et al. |
| 7,497,021 | B2 | 3/2009 | Perchak et al. |
| 7,526,870 | B2 | 5/2009 | Klapper et al. |
| 7,818,891 | B2 * | 10/2010 | Roemhild et al. ......... 33/366.16 |
| 2002/0162235 | A1 | 11/2002 | Rando |
| 2004/0251406 | A1 | 12/2004 | Figueria |

FOREIGN PATENT DOCUMENTS

| CN | 2643349 | 9/2004 |
| JP | 11-14350 | 1/1999 |
| JP | 11-351845 | 12/1999 |
| JP | 2003-106836 | 4/2003 |
| TW | 568480 | 5/2003 |

* cited by examiner

Primary Examiner — Yaritza Guadalupe-McCall
(74) Attorney, Agent, or Firm — Hamre, Schumann, Mueller & Larson, P.C.

(57) ABSTRACT

The inclination sensor (A1) according to the present invention includes a pair of light receiving elements (4A, 4B), a light emitting element (5) for directing light to the light receiving elements (4A, 4B) and a case (2) including a space (20) for accommodating a rolling member (6). The space (20) is configured to cause the rolling member (6) to be located at a pair of light shielding positions at which the rolling member overlaps the light receiving elements (4A, 4B) or a neutral position at which the rolling member does not overlap either of the light receiving elements (4A, 4B). The light receiving elements (4A, 4B) and the light emitting element (5) are mounted on a substrate (1) attached to the case (2) at a surface facing the space (20). A plurality of surface-mounting terminals (7a, 7b, 7c) are provided on a surface of the substrate (1) which is opposite from the surface on which the light receiving elements (4A, 4B) and the light emitting element (5) are mounted.

6 Claims, 10 Drawing Sheets

INCLINATION SENSOR

CROSS REFERENCE TO RELATED APPLICATIONS

This application is a Continuation of U.S. Ser. No. 12/085,328 filed Aug. 5, 2008, which is a U.S. National Stage of PCT/JP2006/323088, filed Nov. 20, 2006, which are incorporated herein by reference.

TECHNICAL FIELD

The present invention relates to an inclination sensor for detecting inclination direction of e.g. a digital still camera.

BACKGROUND ART

FIGS. 14 and 15 show a conventional inclination sensor.

FIG. 14 is a longitudinal sectional view of the inclination sensor, whereas FIG. 15 is a longitudinal sectional view taken along lines XV-XV in FIG. 14. The inclination sensor X shown in the figures includes a case 91, a pair of light receiving elements 92a, 92b, a light emitting element 93, a ball 94 and leads 95, 96. As shown in FIG. 15, the paired light receiving elements 92a, 92b and the light emitting element 93 face each other across a space 91a defined in the case 91. The ball 94 is accommodated in the space 91a.

The paired light receiving elements 92a and 92b are mounted on the lead 95. The light emitting element 93 is mounted on the lead 96. The leads 95 and 96 include external leads 95a and 96a projecting from the case 91. The external leads 95a and 96a are used for mounting the inclination sensor X onto a circuit board S. When the light receiving elements 92a and 92b receive light emitted from the light emitting element 93, the light receiving elements 92a and 92b output light receiving signals to indicate the light reception.

As shown in FIG. 14, when the circuit board S on which the inclination sensor X is mounted is substantially parallel to the horizontal surface, the ball 94 is located on the bottom of the space 91a in FIG. 14. In this state, the light emitted from the light emitting element 93 is not blocked by the ball 94, and hence, received by both of the paired light receiving elements 92.

When the circuit board S is inclined clockwise through an angle not less than the angle θ in FIG. 14, the ball 94 moves within the space 91a to a position indicated by the double-dashed line A. In this state, the ball 94 is located in front of the light receiving element 92b. Thus, of the light emitted from the light emitting element 93, the part which is to reach the light receiving element 92b is blocked by the ball 94. Conversely, when the circuit board S is inclined counterclockwise through an angle not less than the angle θ in FIG. 14, the ball 94 moves within the space 91a to a position indicated by the double-dashed line B. In this state, the ball 94 is located in front of the light receiving element 92a. Thus, of the light emitted from the light emitting element 93, the part which is to reach the light receiving element 92a is blocked by the ball 94.

Thus, by monitoring the light receiving signals outputted from the light receiving element 92a, 92b, it is possible to detect the direction in which the circuit board S, i.e., the inclination sensor X is inclined within a plane which is parallel to the sheet surface of FIG. 14, i.e., within the vertical plane.

The inclination sensor X is mounted to the circuit board S by using the external leads 95a and 96a projecting from the case 91 so that the inclination sensor X stands upright on the circuit board S as shown in FIG. 14. Thus, the plane which contains inclination direction to be detectable by the inclination sensor X (hereinafter referred to as the "detection target plane") is perpendicular to the mount surface of the circuit board S. Thus, the inclination sensor X cannot detect the rotation of the circuit board S made within a plane which is generally parallel to the mount surface.

An inclination sensor may be incorporated in a digital still camera whose body is in the form of a horizontally elongated rectangular parallelepiped. In this case, the sensor detects whether the image to be captured is vertically elongate or horizontally elongate. Based on the detection result, the orientation of the image to be displayed at the liquid crystal display may be automatically switched. Specifically, when the body of a digital camera is held horizontally, a horizontal image is captured. When the camera body is held vertically, a vertical image is captured. Thus, with an inclination sensor mounted to a circuit board incorporated in the digital camera, it is possible to detect the inclination of the body of the camera within a vertical plane, thereby deciding whether the body of the camera is held horizontally or vertically. Based on the detection result, the orientation of the image to be displayed at the liquid crystal display can be automatically adjusted so as to correspond to the image to be captured.

However, the circuit board carrying the inclination sensor is often disposed in parallel to the longitudinal direction of the body. When the cameral body is inclined within the vertical plane in taking a picture, the circuit board rotates, with the mount surface standing generally vertically. As noted above, the detection target plane of the inclination sensor X is a plane which is perpendicular to the mount surface of the circuit board S. Thus, when the circuit board S on which the inclination sensor X is mounted is incorporated in a camera body, the detection target plane of the inclination sensor X in the photographing posture is generally parallel to the horizontal surface. Thus, even when the camera body is inclined within the vertical plane in photographing, the ball 94 in the inclination sensor X does not move to the position A or B shown in FIG. 4. In this sense, the conventional inclination sensor X is not suitable for detecting the photographing posture of a digital camera.

Patent Document 1: JP-A-H11-14350

DISCLOSURE OF THE INVENTION

The present invention is proposed under the circumstances described above. It is, therefore, an object of the present invention is to provide an inclination sensor capable of solving the above-described problems.

According to the present invention, there is provided an inclination sensor to be mounted to a target device subjected to inclination detection. The sensor comprises a case provided with a vacant space, and a rolling member movably accommodated in the vacant space. The inclination sensor is configured to detect an inclination of the target device based on a positional change of the rolling member within the vacant space due to a change in gravitational direction as the target device is caused to incline. The sensor further comprises: a substrate attached to a side surface of the case, the side surface being parallel to a plane along which the rolling member is movable, the substrate including a first surface that faces the vacant space and is provided with a pair of light receiving elements spaced from each other; and a light emitter for emitting light toward the light receiving elements. The vacant space of the case is configured to cause the rolling member to be brought to a pair of light shielding positions and a neutral position due to the change in gravitational direction, where the light shielding positions correspond in location to the light receiving elements respectively, whereas the neutral position is located out of the light receiving elements. The substrate includes a second surface opposite to the first surface provided with the light receiving elements, and the second surface is provided with a plurality of terminals for surface-mounting.

Preferably, the light emitter may comprise a light emitting element disposed on the first surface of the substrate between the light receiving elements in a manner such that the light emitting element and the light receiving elements are arranged on the same straight line. In addition, a reflection surface may be provided for reflecting light emitted from the light emitting element, where the reflection surface is arranged at a location opposite from the substrate across the vacant space of the case.

Preferably, the rolling member may have a columnar shape whose central axis extends perpendicularly to the plane along which the rolling member moves.

BEST MODE FOR CARRYING OUT THE INVENTION

Preferred embodiments of the present invention will be described below with reference to the accompanying drawings.

Figure 1:
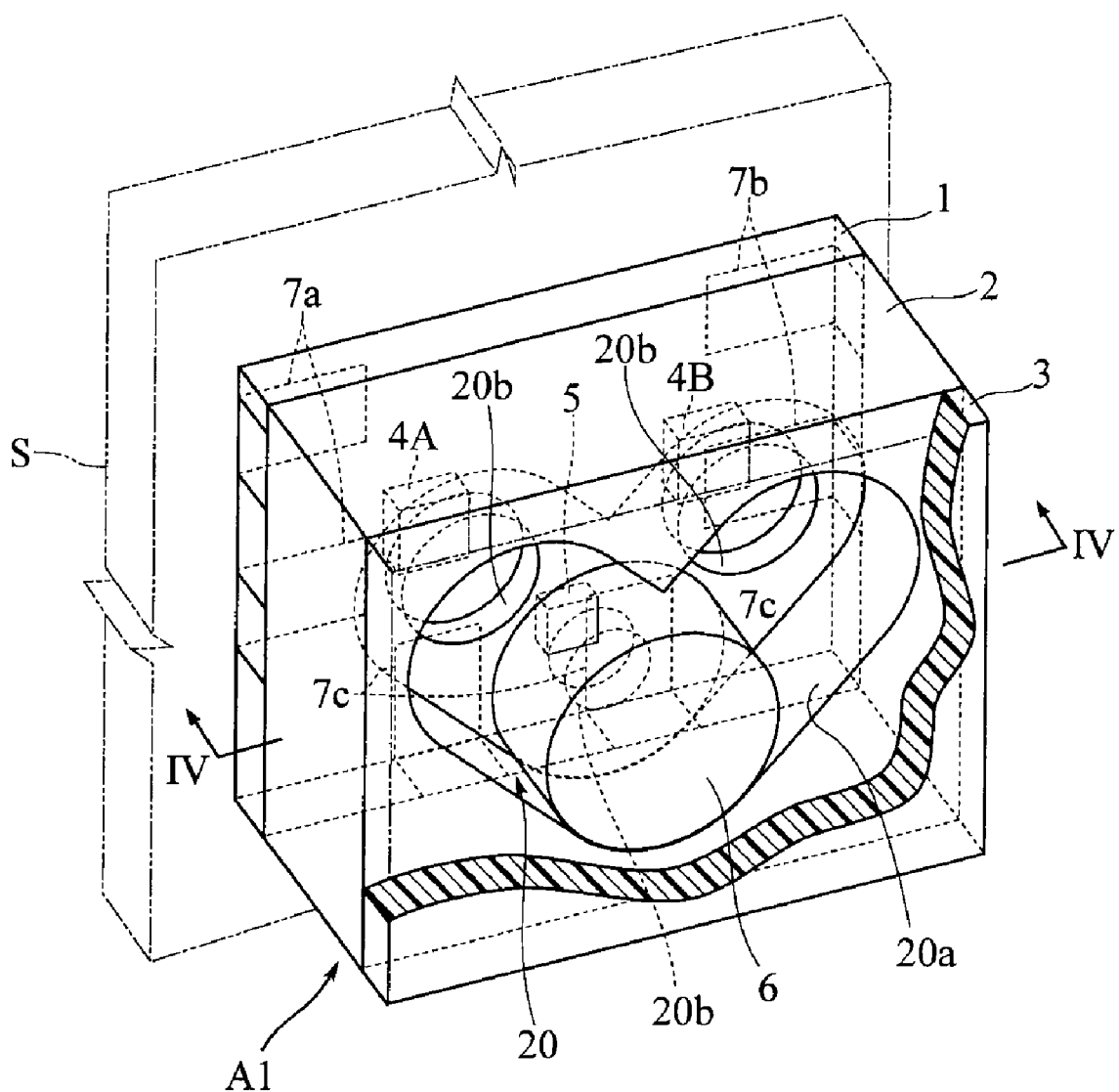
FIG. 1 is a perspective view, partially in section, showing an inclination sensor according to a first embodiment of the present invention.
Figure 2:
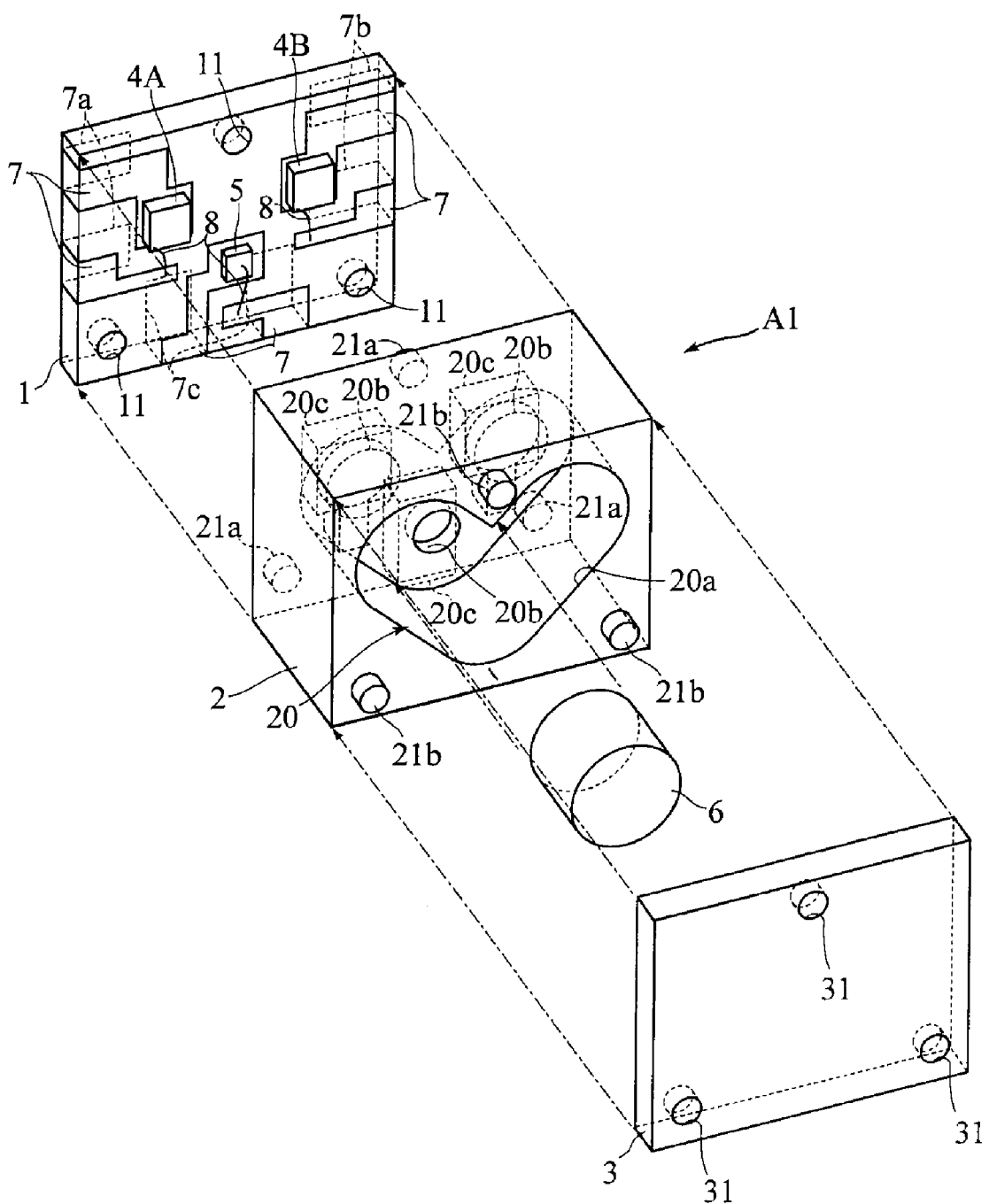
FIG. 2 is an exploded perspective view of the inclination sensor shown in FIG. 1.
Figure 3:
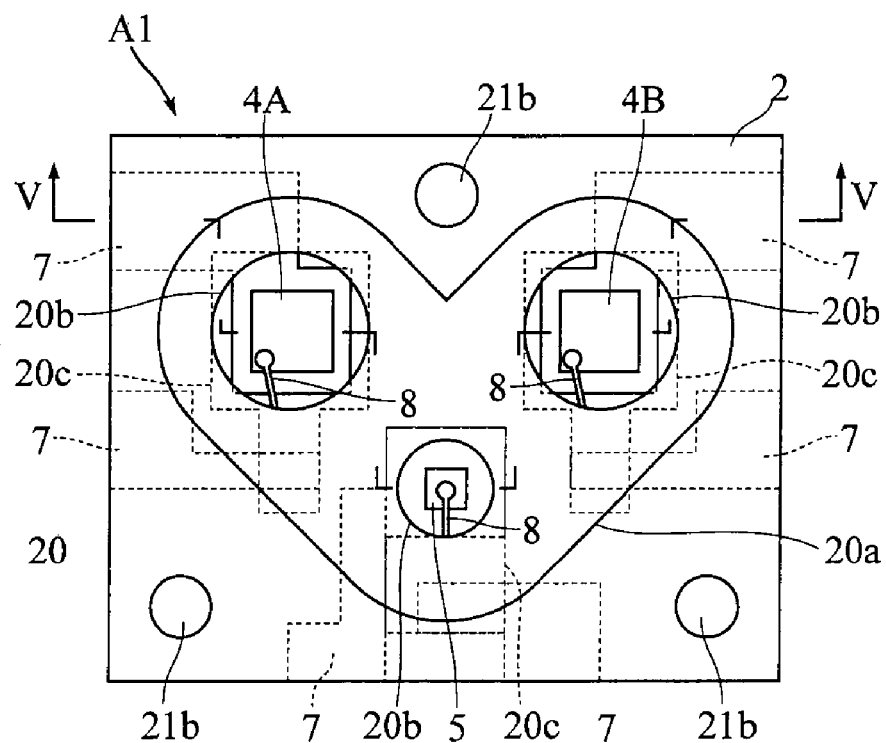
FIG. 3 is a front view of the inclination sensor shown in FIG. 1.
Figure 4:
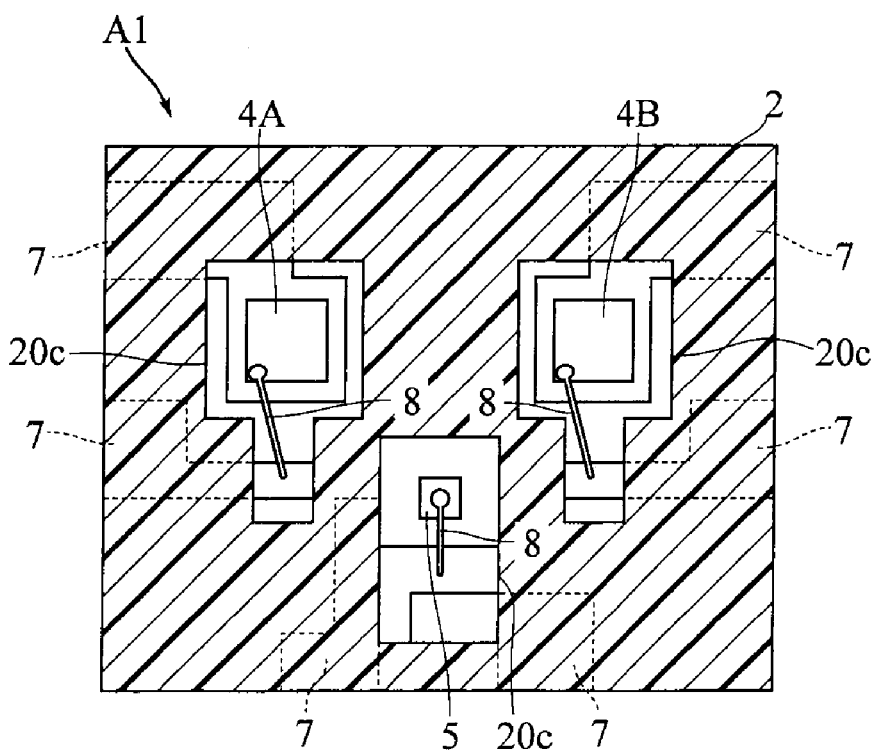
FIG. 4 is a sectional view taken along lines IV-IV in FIG. 1.
Figure 5:
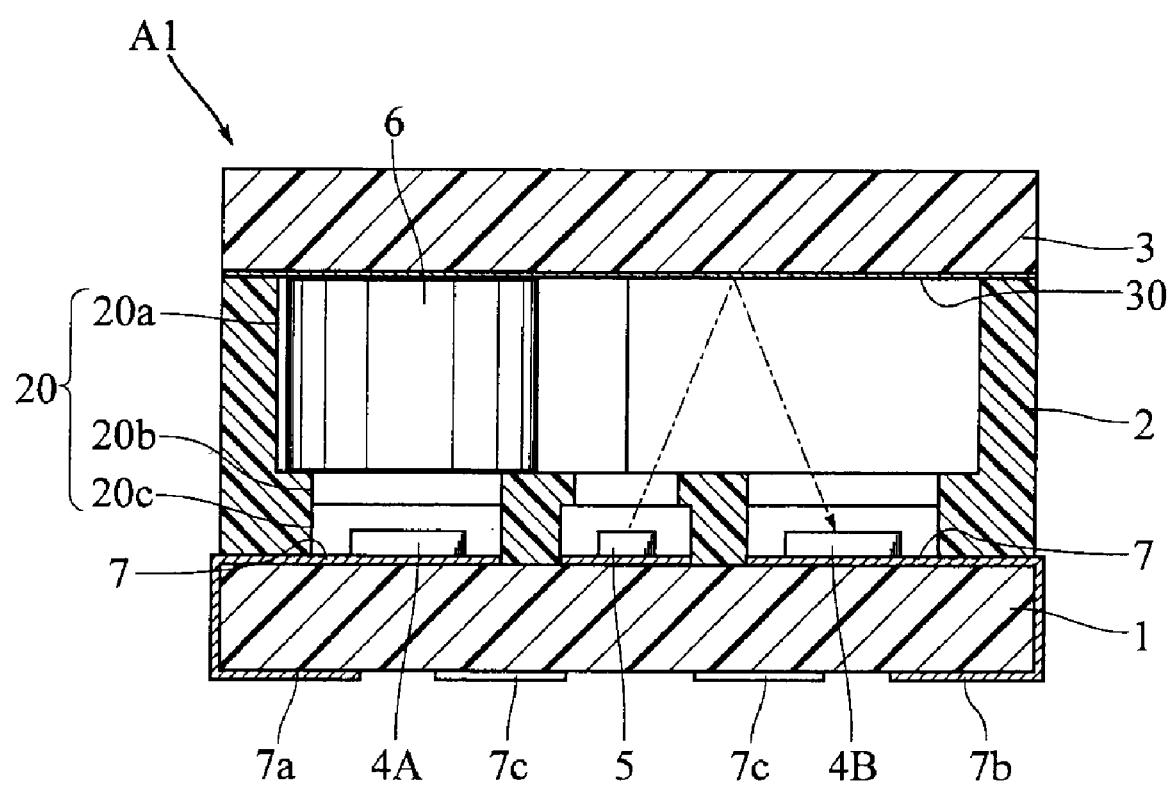
FIG. 5 is a sectional view taken along lines V-V in FIG. 3.

FIGS. 1-5 show an inclination sensor according to a first embodiment of the present invention. Specifically, FIG. 1 is a perspective view, partially in section, showing the inclination sensor, FIG. 2 is an exploded perspective view of the inclination sensor, FIG. 3 is a front view of the inclination sensor, FIG. 4 is a sectional view taken along lines IV-IV in FIG. 1 and FIG. 5 is a sectional view taken along lines V-V in FIG. 3.

As shown in FIG. 1, the inclination sensor A1 includes a substrate 1, a case 2, a cover 3, a pair of light receiving elements 4A, 4B, a light emitting element 5, a rolling member 6 and terminals 7a, 7b, 7c. By surface-mounting the inclination sensor A1 to e.g. a circuit board S, the direction of rotation of the circuit board S at the mount surface is detected by the inclination sensor. That is, the detection target plane of the inclination sensor A1 is generally parallel to the mount surface of the circuit board S. The inclination sensor A1 is about 5.6 mm in width, 4.5 mm in height and 3.7 mm in thickness. In FIG. 3, the illustration of the cover 3 is omitted.

The substrate 1 is a rectangular insulating plate made of e.g. glass fiber reinforced epoxy resin. The substrate 1 is about 5.6 mm in width, 4.5 mm in height and 0.6 mm in thickness. As shown in FIG. 2, the substrate 1 is formed with six wiring patterns 7. The wiring patterns 7 may be made of e.g. copper and formed by etching a thin film of copper. The six wiring patterns 7 include two wiring patterns extending from the front surface to the rear surface of the substrate 1 across the left side surface of the substrate 1 in FIG. 2, two wiring patterns extending from the front surface to the rear surface of the substrate 1 across the right side surface of the substrate 1 in FIG. 2, and two wiring patterns extending from the front surface to the rear surface of the substrate 1 across the lower side surface of the substrate 1 in FIG. 2.

Referring to FIG. 2, the light receiving elements 4A and 4B are respectively bonded to the two wiring patterns 7 formed on opposite upper portions of the front surface of the substrate 1. The light emitting element 5 is bonded to the left one of the two wiring patterns 7 formed on lower portions of the front surface of the substrate 1.

The light receiving elements 4A and 4B may comprise a PIN photo diode. Upon receiving infrared light, each of the light receiving elements 4A and 4B generates photoelectromotive force corresponding to the infrared light and outputs a light receiving signal corresponding to the photoelectromotive force. As shown in FIG. 2, on the substrate 1, the light receiving elements 4A and 4B are arranged at the same height and spaced from each other by a predetermined distance. Each of the light receiving elements 4A and 4B is connected, via a wire 8, to the wiring pattern 7 located below the wiring pattern on which the light receiving element is bonded. The size of the light receiving elements 4A, 4B is about 0.6 mm×0.6 mm.

The light emitting element 5 may be an infrared emitting diode and corresponds to the light emitter according to the present invention. As shown in FIG. 2, the light emitting element 5 is arranged at a position deviated downward in the figure from the middle position between the paired light receiving elements 4A and 4B. The light emitting element 5 is connected, via a wire 8, to the wiring pattern 7 located on the right side of the wiring pattern 7 on which the light emitting element 5 is bonded. The size of the light emitting element 5 is about 0.25 mm×0.25 mm.

The case 2 is in the form of a rectangular parallelepiped and made of epoxy resin, for example. Specifically, the case 2 is formed by molding to a size of about 5.6 mm in width, 4.5 mm in height and 2.5 mm in thickness. The case 2 includes a vacant space 20. The space 20 comprises a hollow portion having a predetermined shape. As shown in FIG. 2, the space 20 includes a rolling member accommodating portion 20a, three windows 20b and three element accommodating portions 20c.

The rolling member accommodating portion 20a accommodates the rolling member 6. In the rolling member accommodating portion 20a, the rolling member 6 rolls to a predetermined position corresponding to the posture of the inclination sensor A1. The rolling member accommodating portion 20a has a shape obtained by connecting two hollow portions, which are oval in cross section, perpendicularly to each other (heart-shaped as a whole). The rolling member accommodating portion 20a has a depth capable of accommodating the rolling member 6. Each of the oval hollow portions is about 2.2 mm in width and includes two opposite arcuate portions having a radius of about 1.1 mm. The depth of the rolling member accommodating portion 20a is about 1.7 mm. As shown in FIGS. 3 and 5, the three windows 20b are connected to the rolling member accommodating portion 20a.

Referring to FIG. 3, the two windows 20b located at upper portions in the figure are connected to upwardly-projecting portions of the rolling member accommodating portion 20a. The window 20b located at a lower portion is connected to the center portion of the rolling member accommodating portion 20a. The three windows 20b are circular in cross section. The windows 20b allow light to reach the light receiving elements 4A, 4B or the light emitted from the light emitting element 5 to pass therethrough. Referring to FIG. 5, the two windows 20b located on opposite sides are about 1.3 mm in diameter ϕ in cross section and 0.3 mm in depth. The window 20b located at the center is about 0.8 mm in diameter ϕ in cross section and 0.3 mm in depth. The three windows 20b are connected to the three element accommodating portions 20c, respectively.

As shown in FIG. 5, the three element accommodating portions 20c accommodate the light receiving elements 4A, 4B and the light emitting element 5, respectively. As shown in FIG. 4, each of the two element accommodating portion 20c accommodating the light receiving elements 4A, 4B has a shape obtained by connecting two hollow portions, which are rectangular in cross section, to each other. The element accommodating portion 20c accommodating the light emitting element 5 is rectangular in cross section. The element accommodating portions 20c are about 0.5 mm in depth.

As shown in FIG. 2, the front surface of the case 2 is formed with three projections 21b, whereas the rear surface of the case is formed with three projections 21a. The projections 21a, 21b are arranged on an upper center portion and two lower end portions in each surface. The projections 21a, 21b are used for positioning the case 2, the substrate 1 and the cover 3 relative to each other. The three projections 21a are fitted into three holes 11 formed in the substrate 1. The three projections 21b are fitted into three holes 31 formed in the cover 3.

The cover 3 is bonded to the case 2 to define the space 20. The cover 3 may be made of epoxy resin, for example. Referring to FIG. 5, the lower surface of the cover 3 is provided with a reflection film 30. The reflection film 30 reflects the light emitted from the light emitting element 5 to direct the light to the light receiving elements 4A and 4B. The reflection film 30 may be made of aluminum, for example. The cover 3 is about 5.6 mm in width, 4.5 mm in height and 0.6 mm in thickness.

The rolling member 6 is columnar and may be made of stainless steel, for example. The rolling member 6 rolls within the rolling member accommodating portion 20a correspondingly to the posture of the inclination sensor A1. By the rolling, the rolling member 6 appropriately prevents the light emitted from the light emitting element 5 from reaching the light receiving element 4A, 4B. The rolling member 6 is about 2.0 mm in diameter p in cross section and 1.5 mm in height.

The terminals 7a, 7b, 7c are used for surface-mounting the inclination sensor A1 to e.g. a circuit board S shown in FIG. 1. As shown in FIG. 5, the terminals 7a, 7b, 7c comprise portions of the wiring patterns 7 which are located on the lower surface side of the substrate 1 (i.e., portions of the wiring pattern 7 on the rear surface side in FIG. 2).

Figure 6:
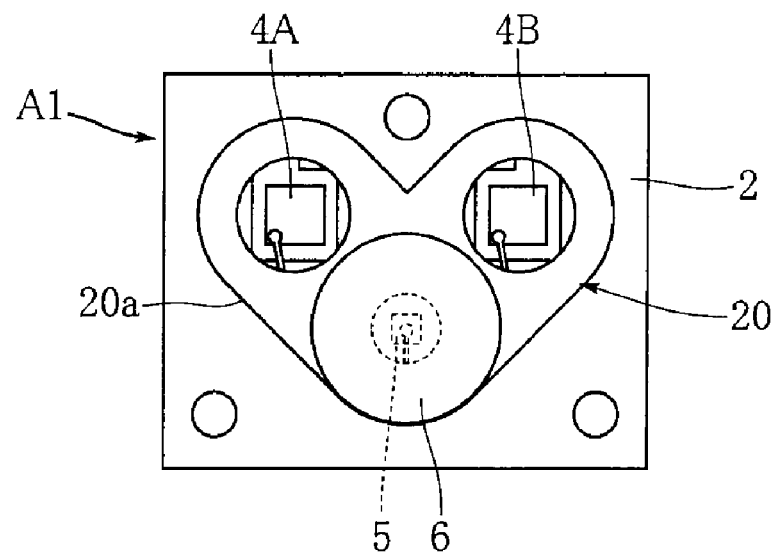
FIG. 6 is a front view showing the inclination sensor of FIG. 1 in a neutral posture.
Figure 7:
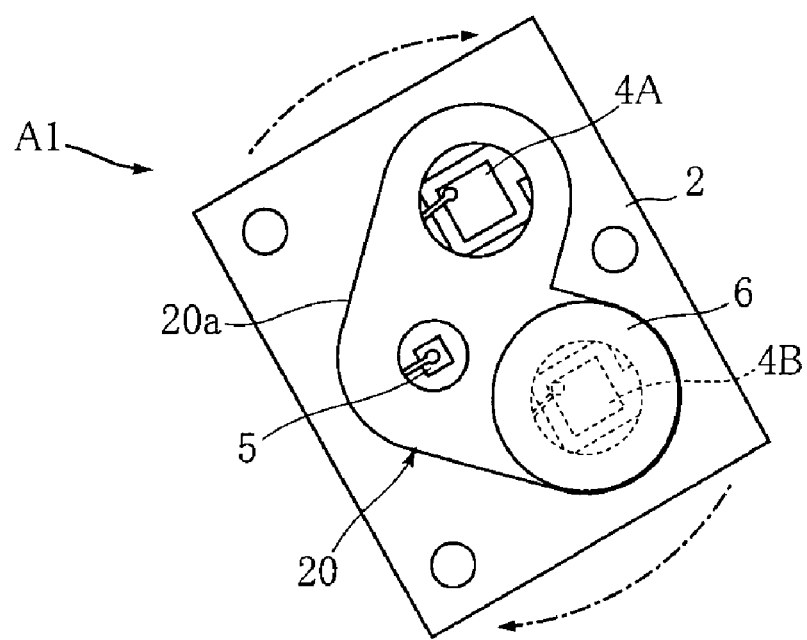
FIG. 7 is a front view showing the inclination sensor of FIG. 1 in a state inclined in the forward direction.
Figure 8:
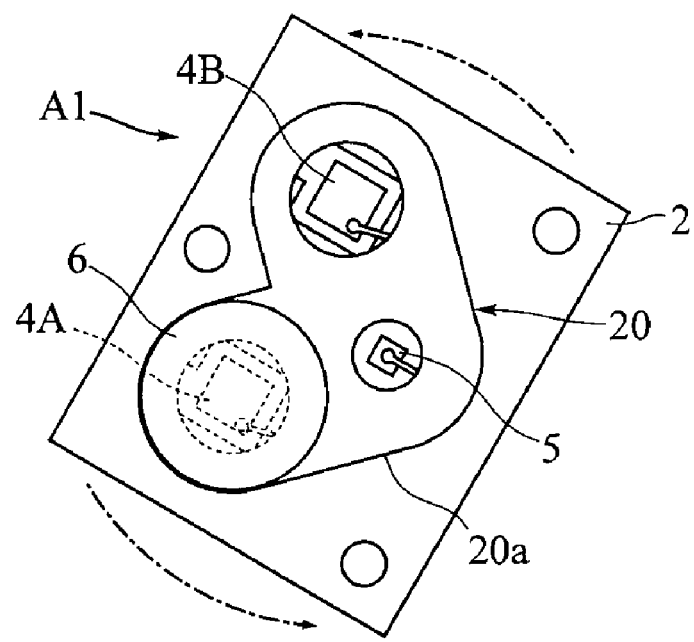
FIG. 8 is a front view showing the inclination sensor of FIG. 1 in a state inclined in the reverse direction.

The detection of inclination direction by using the inclination sensor A1 will be described below with reference to FIGS. 6-8. FIGS. 6-8 are a front view showing the inclination sensor A1 in a state when the sensor-mounting surface of the substrate 1 is held in parallel to a vertical plane. Thus, in FIGS. 6-8, the downward direction is the gravitational direction. For convenience of description, the cover 3 is not illustrated in FIGS. 6-8.

FIG. 6 shows the inclination sensor A1 in its neutral posture. In this neutral posture, the rolling member 6 rests at the middle position in the rolling member accommodating portion 20a due to gravity. Hereinafter, this position is referred to as "neutral position".

When the rolling member 6 is at the neutral position, the window 20b facing the light emitting element 5 is covered by the rolling member 6. Thus, the light emitted from the light emitting element 5 does not enter the rolling member accommodating portion 20a, so that the light from the light emitting element 5 is not reflected by the reflection film 30 to impinge on the light receiving elements 4A and 4B. Thus, neither of the light receiving elements 9A and 4B detects light. As a result, neither of the light receiving elements 4A and 4B outputs a light receiving signal. Accordingly, when no light receiving signal is outputted from the light receiving elements 4A and 4B, it is determined that the inclination sensor A is in the neutral posture.

When the inclination sensor A1 is rotated clockwise from the state shown in FIG. 6, the inclination sensor has the posture as shown in FIG. 7. In this state, the rolling member 6 is located at the right end in the rolling member accommodating portion 20a by gravity. Hereinafter, this position is referred to as "forward light shielding position".

When the rolling member 6 is at the forward light shielding position, only the window 20b facing the light receiving element 9B is covered by the rolling member 6. In this state, the light emitted from the light emitting element 5 enters the rolling member accommodating portion 20a to be reflected by the reflection film 30. Although the reflected light impinges on the light receiving element 4A, the light does not impinge on the light receiving element 4B. Thus, the light emitted from the light emitting element 5 is not received by the light receiving element 4B but received only by the light receiving element 4A.

As a result, only the light receiving element 4A outputs a light receiving signal. Accordingly, when a light receiving signal is outputted from the light receiving element 4A but is not outputted from the light receiving element 4B, it is determined that the inclination sensor A1 has the posture shown in FIG. 7.

When the inclination sensor A1 is rotated counterclockwise from the state shown in FIG. 6, the inclination sensor has the posture as shown in FIG. 8. In this state, the rolling member 6 is located at the left end in the rolling member accommodating portion 20a by gravity. Hereinafter, this position is referred to as "reverse light shielding position".

When the rolling member 6 is at the reverse light shielding position, only the window 20b facing the light receiving element 4A is covered by the rolling member 6. In this state, the light emitted from the light emitting element 5 enters the rolling member accommodating portion 20a to be reflected by the reflection film 30. Although the reflected light impinges on the light receiving element 4B, the light does not impinge on the light receiving element 4A. Thus, the light emitted from the light emitting element 5 is not received by the light receiving element 4A but received only by the light receiving element 4B.

As a result, only the light receiving element 4B outputs a light receiving signal. Accordingly, when a light receiving signal is outputted from the light receiving element 4B but is not outputted from the light receiving element 4A, it is determined that the inclination sensor A1 has the posture shown in FIG. 8.

The advantages of the inclination sensor A1 will be described below.

As understood from FIG. 1, the inclination sensor A1 according to the first embodiment detects the rotation of the circuit board S occurring in a plane which is substantially parallel to the mount surface of the circuit board S. The circuit board S with the inclination sensor A1 mounted may be incorporated in a digital camera. When the camera body is inclined within a vertical plane in photographing, the circuit board S rotates within the vertical plane, and hence, the inclination sensor A1 mounted on the circuit board S also rotates within the detection target plane. As a result, the rolling member 6 moves properly within the rolling member accommodating portion 20a. Thus, the rotation of the circuit board S, i.e., the inclination of the camera body can be detected. The inclination sensor A1 is suitably used in a digital still camera to enable automatic switching for proper orientation of an image to be displayed on the liquid crystal display.

Since the inclination sensor A1 is structured as a surface mount component, the inclination sensor can be mounted on e.g. the circuit board S collectively with other electronic components. Thus, the efficiency in mounting components on the circuit board S is enhanced.

In the inclination sensor A1, all of the paired light receiving elements 4A, 4B and the light emitting element 5 are mounted on the substrate 1. In addition, the cover 3 provided in front of the case 2 in FIG. 1 is in the form of a thin plate. Thus, the inclination sensor A1 has an advantageously small thickness. Such a thin inclination sensor A1 can be mounted on the circuit board S in a manner lying on the surface of the circuit board S. This arrangement prevents the inclination sensor A1 from protruding unduly from the circuit board S.

In the inclination sensor A1, the cross-sectional size of the columnar rolling member 6 is larger than that of the windows 20b of the space 20. Thus, the rolling member 6 can roll smoothly within the rolling member accommodating portion 20a, without being caught in the windows 20b.

The rolling member 6 can appropriately close the window 20b by its circular end surface. Specifically, when the rolling member 6 comes in front of the window 20b, the circular end surface of the rolling member completely blocks up the window 20b. Thus, erroneous detection by the inclination sensor A1 is prevented. Moreover, due to the columnar shape, the rolling member can roll smoothly even when its height is reduced. This is advantageous for reducing the thickness of the inclination sensor A1.

FIGS. 9-13 show other embodiments of the present invention. In these figures, the elements which are identical or similar to those of the foregoing embodiment are designated by the same reference signs as those used for the forgoing embodiment.

Figure 9:
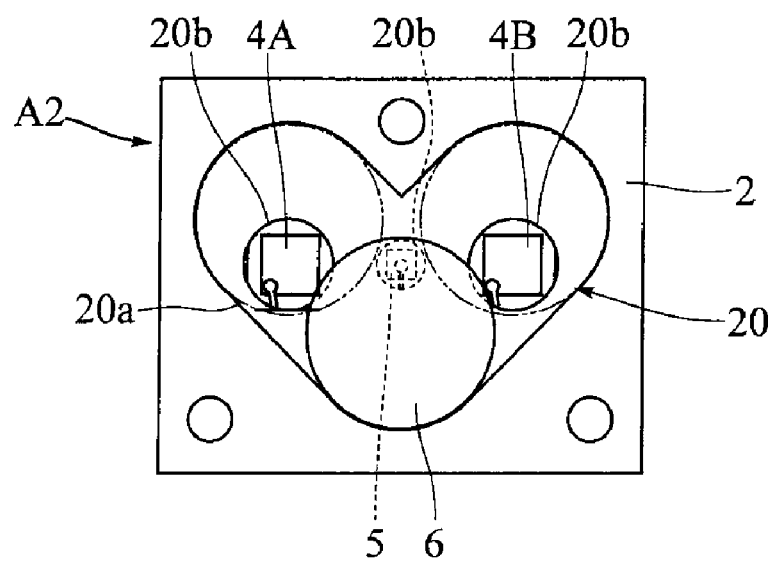
FIG. 9 is a front view showing an inclination sensor according to a second embodiment of the present invention.

FIG. 9 shows an inclination sensor according to a second embodiment of the present invention. In this figure, the illustration of the cover 3 shown in FIG. 1 is omitted.

The inclination sensor A2 of the second embodiment differs from the inclination sensor A1 of the first embodiment in arrangement of the paired light receiving elements 4A, 4B and the light emitting element 5. Specifically, in this embodiment, the light receiving elements 4A, 4B and the light emitting element 5 are so arranged that the respective centers are located on a straight line. Three windows 20b are so arranged that the respective centers of the windows are located on a straight line correspondingly to the arrangement of the light receiving elements 4A, 4B and the light emitting element 5.

Figure 14:
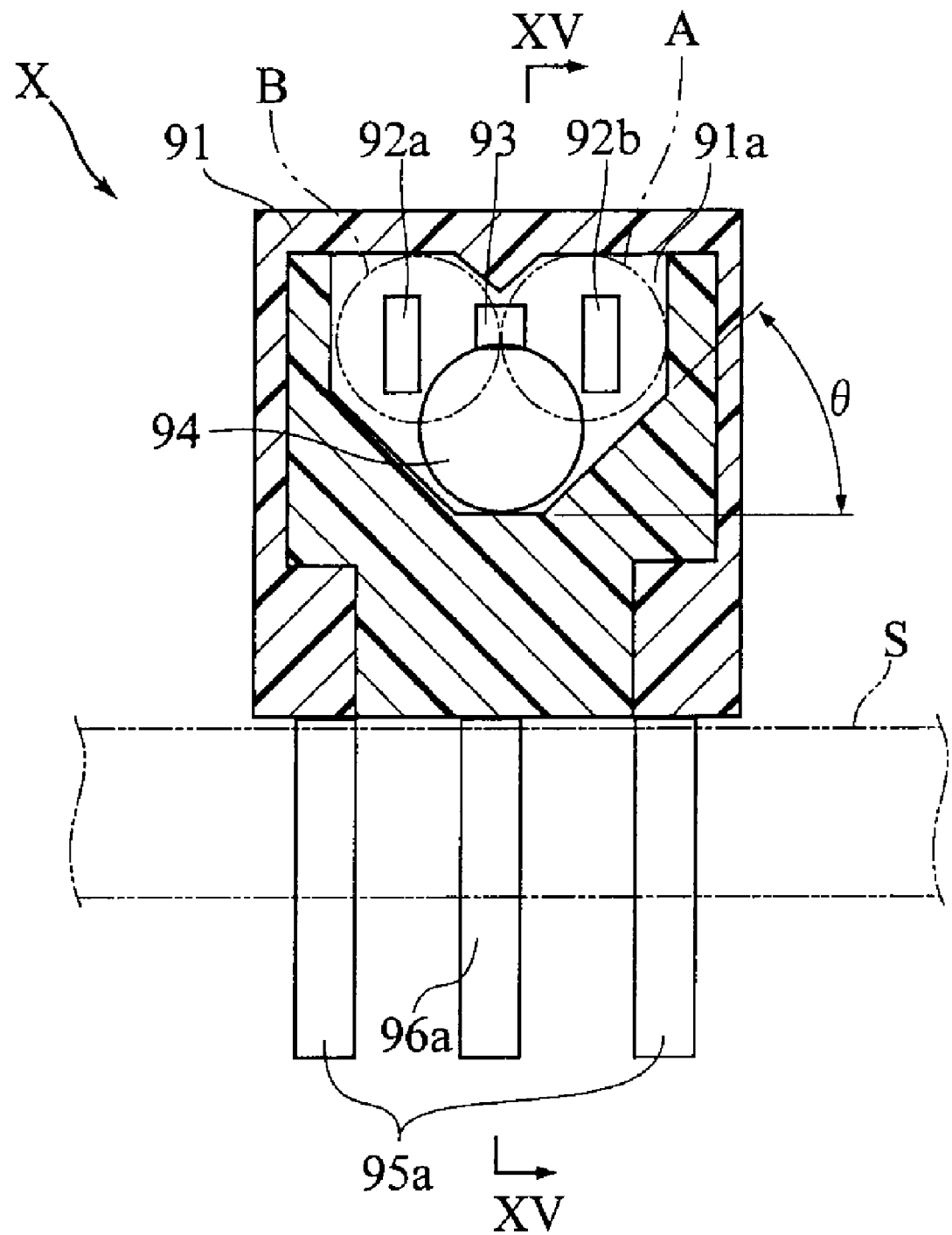
FIG. 14 is a longitudinal sectional view of a conventional inclination sensor.
Figure 15:
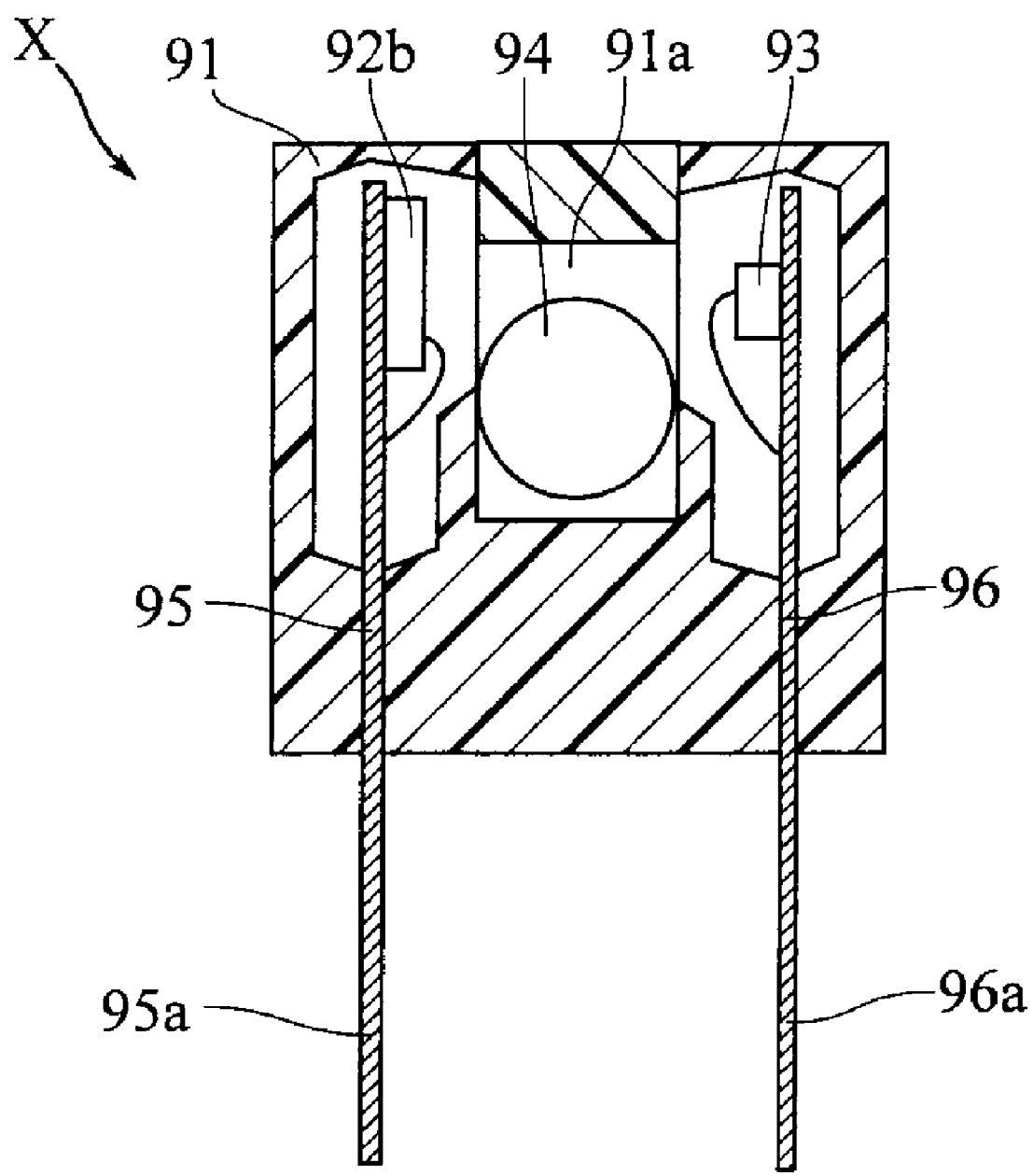
FIG. 15 is a longitudinal sectional view taken along lines XV-XV in FIG. 14.

According to the second embodiment again, by mounting the inclination sensor A2 on a circuit board S, the rotation of the circuit board S through an angle not less than a predetermined value (e.g. rotation through the angle θ in FIG. 14) within a plane which is substantially parallel to the mount surface is properly detected. In manufacturing the inclination sensor A2, the light receiving elements 4A, 4B and the light emitting element 5 are aligned on the substrate 1. Thus, the manufacturing efficiency is enhanced as compared with the first embodiment in which the light receiving elements 4A, 4B and the light emitting element 5 are so arranged as to substantially form a triangle.

Figure 10:
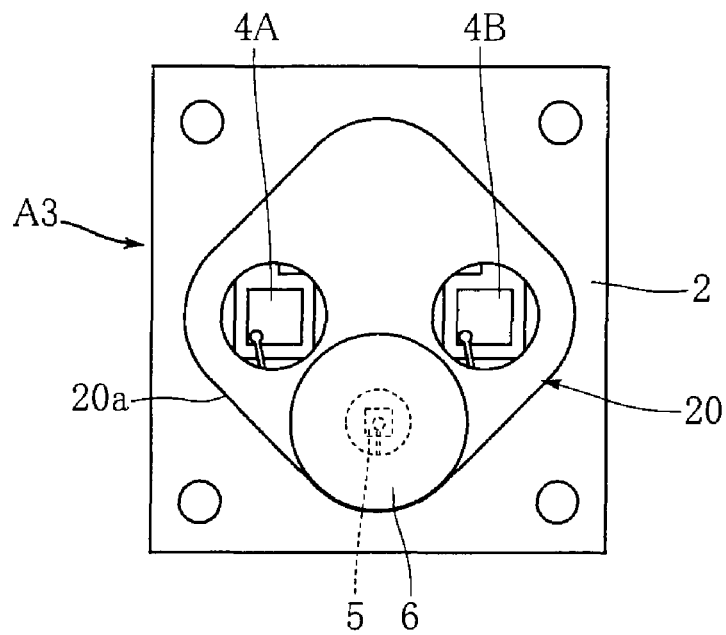
FIG. 10 is a front view showing an inclination sensor according to a third embodiment of the present invention.
Figure 11:
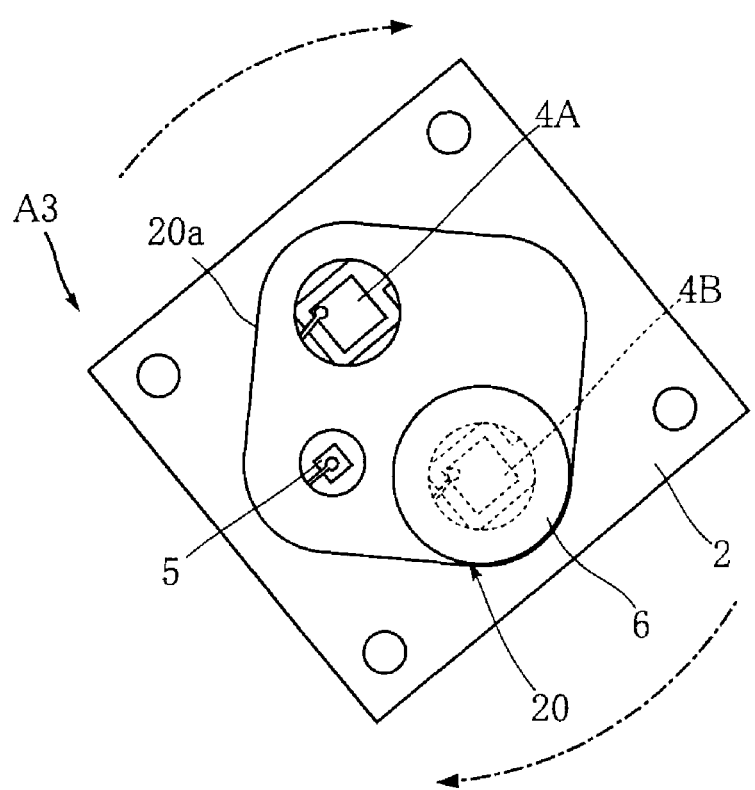
FIG. 11 is a front view showing the inclination sensor of FIG. 10 in a state inclined in the forward direction.
Figure 12:
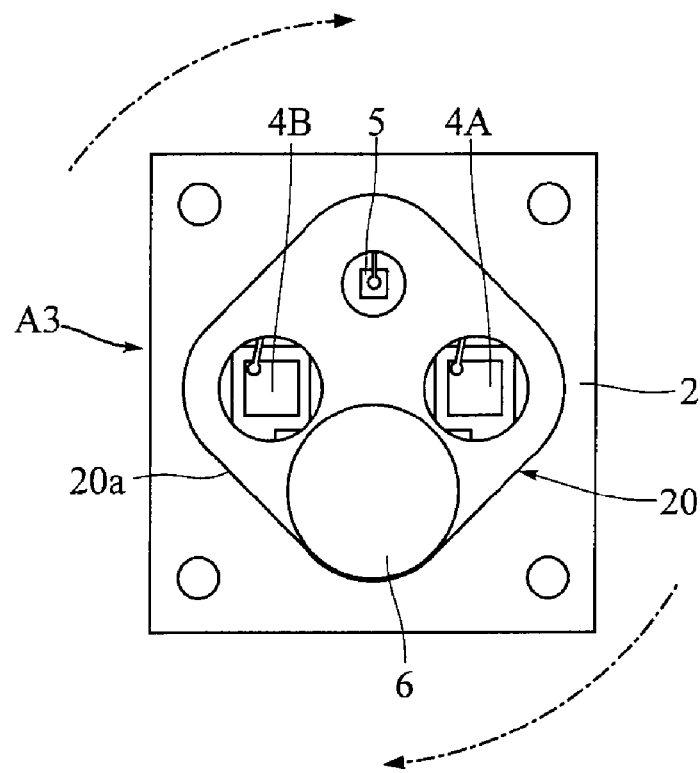
FIG. 12 is a front view showing the inclination sensor of FIG. 10 in an inverted posture.

FIGS. 10-12 show an inclination sensor according to a third embodiment of the present invention. In these figures, the illustration of the cover 3 shown in FIG. 1 is omitted.

The inclination sensor A3 of the third embodiment differs from those of the first and the second embodiments in cross sectional configuration of the rolling member accommodating portion 20a. Specifically, in the third embodiment, the space 20 is rhombus in cross section.

As shown in FIG. 10, when the inclination sensor A3 has the neutral posture, the rolling member 6 is located in front of the light emitting element 5. When the inclination sensor A3 is rotated clockwise in the figure, the inclination sensor has the posture shown in FIG. 11, and the rolling member 6 moves to the forward light shielding position, which is in front of the light receiving element 4B. When the inclination sensor A3 is further rotated clockwise, the inclination sensor A3 is inverted, as shown in FIG. 12. In this case, the rolling member 6 moves within the rolling member accommodating portion 20a to a position which is opposite from the neutral position.

Hereinafter, this position is referred to as "inverted position".

When the rolling member 6 is located at the inverted position, both of the light receiving elements 4A and 4B receive the light emitted from the light emitting element 5. In the inclination sensor A3, therefore, when light receiving signals are outputted from both of the light receiving elements 4A and 4B, it is determined that the inclination sensor A3 has the inverted posture. Thus, the inclination sensor A3 detects four states, i.e., the neutral posture, the posture forwardly rotated or reversely rotated from the neutral posture and the inverted posture.

In the case of the above-described first embodiment, the inclination sensor A1 may be rotated further from the state shown in FIG. 7 or 8 until it is brought into an inverted posture. In this state, the inclination sensor A1 is not capable of detecting the inversion. Instead, the inclination sensor A1 can only detect the fact that it is in a forwardly rotated state or reversely rotated state. The inclination sensor A3, on the other hand, can properly detect that it is in an inverted state, no matter which direction, forwardly or reversely, the sensor. A3 has been rotated.

Figure 13:
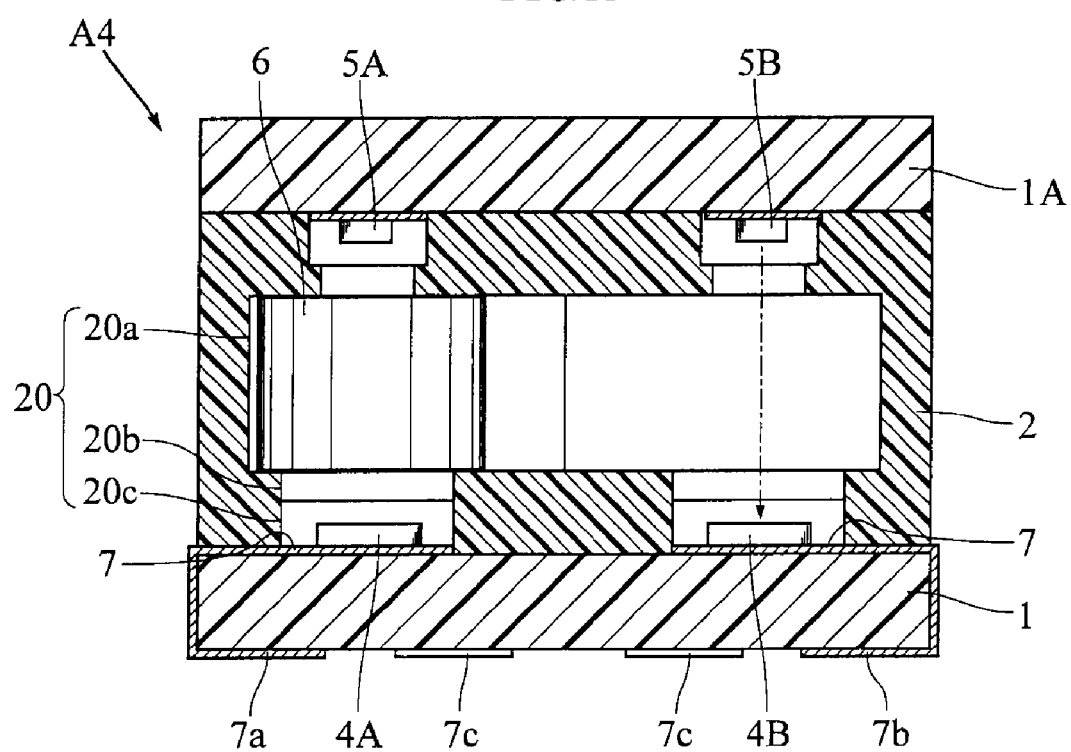
FIG. 13 is a sectional view showing an inclination sensor according to a fourth embodiment of the present invention.

FIG. 13 shows an inclination sensor according to a fourth embodiment of the present invention. Differing from the first through the third embodiments, the inclination sensor A4 of the fourth embodiment includes a pair of light emitting elements 5A and 5B as the light emitter.

The light emitting elements 5A and 5B are arranged on a substrate 1A to face the light receiving elements 4A and 4B, respectively. The light emitting elements 5A and 5B are mounted on a wiring pattern on the substrate 1A. The wiring pattern extends outside the case 2 to be electrically connected to terminals 7c. Alternatively, the wiring pattern may be electrically connected to the terminals 7c by the provision of a through-hole (not shown). According to the fourth embodiment again, the inclination sensor A4 can be surface-mounted on a circuit board S (not shown). Thus, the rotation of the circuit board S within a plane which is substantially parallel to the mount surface is properly detected.

The inclination sensor according to the present invention is not limited to the foregoing embodiments. The specific structure of each part of the inclination sensor according to the present invention may be varied in design in various ways.

Although it is preferable that the rolling member according to the present invention is columnar like the foregoing embodiments, the present invention is not limited thereto. For instance, the rolling member may be spherical. The light to be emitted from the light emitting element is not limited to infrared light, and light having a different wavelength may be used.

The invention claimed is:

1. An inclination sensor to be mounted to a target device subjected to inclination detection, the sensor comprising:
a case provided with a vacant space; and a rolling member movably accommodated in the vacant space; the inclination sensor being configured to detect an inclination of the target device based on a positional change of the rolling member within the vacant space due to a change in gravitational direction as the target device is caused to incline, the sensor further comprising:
a substrate mounted to a rear surface of the case, the rear surface being parallel to a rolling plane along which the rolling member is movable, the substrate including a first surface that faces the vacant space and is provided with a pair of light receiving elements spaced from each other and a light emitting element for emitting light to be received by the light receiving elements;
wherein the vacant space of the case is configured to cause the rolling member to be brought to a pair of light shielding positions and a neutral position due to the change in gravitational direction, the light shielding positions corresponding in location to the light receiving elements respectively, and the neutral position corresponding in location to the light emitting element and being located out of the light receiving elements;
wherein the substrate includes a second surface opposite to the first surface provided with the light receiving elements and the light emitting element, the second surface being provided with a plurality of terminals extending in parallel to the rolling plane for surface-mounting;
wherein a reflection surface is provided for reflecting light emitted from the light emitting element, the reflection surface being arranged at a location opposite from the substrate across the vacant space of the case; and
wherein the reflection surface of the case is made of a thin film.

2. The inclination sensor according to claim 1, wherein the rolling member has a columnar shape having a central axis extending perpendicularly to the plane along which the rolling member moves.

3. The inclination sensor according to claim 1, further comprising a wiring pattern formed on the first surface of the substrate for bonding the light emitting element and the light receiving elements, the wiring pattern extending to the second surface of the substrate and connected to the terminals for surface mounting.

4. A combination of an inclination sensor and a circuit board, the circuit board having a mount surface on which the inclination sensor is attached for inclination detection of the circuit board, the inclination sensor comprising: a case provided with a vacant space; and a rolling member movably accommodated in the vacant space; the inclination sensor being configured to detect an inclination of the circuit board based on a positional change of the rolling member within the vacant space due to a change in gravitational direction as the target device is caused to incline, the sensor further comprising:
a substrate mounted to a rear surface of the case, the substrate including a first surface that faces the vacant space and is provided with a pair of light receiving elements spaced from each other and a light emitting element for emitting light to be received by the light receiving elements;
wherein the vacant space of the case is configured to cause the rolling member to be brought to a pair of light shielding positions and a neutral position due to the change in gravitational direction, the light shielding positions corresponding in location to the light receiving elements respectively, and the neutral position corresponding in location to the light emitting element and being located out of the light receiving elements;
wherein the substrate includes a second surface opposite to the first surface provided with the light receiving elements and the light emitting element;
wherein the mount surface of the circuit board is parallel to the rolling plane along which the rolling member is movable; and
wherein the second surface of the substrate is provided with a plurality of terminals extending in parallel to the rolling surface for surface-mounting to the mount surface of the circuit board.

5. An inclination sensor to be mounted to a target device subjected to inclination detection, the sensor comprising:
a case provided with a vacant space; and a rolling member movably accommodated in the vacant space; the inclination sensor being configured to detect an inclination of the target device based on a positional change of the rolling member within the vacant space due to a change in gravitational direction as the target device is caused to incline, the sensor further comprising:
a substrate mounted to a rear surface of the case, the rear surface being parallel to a rolling plane along which the rolling member is movable, the substrate including a first surface that faces the vacant space and is provided with a pair of light receiving elements spaced from each other and a light emitting element for emitting light to be received by the light receiving elements;
wherein the vacant space of the case is configured to cause the rolling member to be brought to a pair of light shielding positions and a neutral position due to the change in gravitational direction, the light shielding positions corresponding in location to the light receiving elements respectively, and the neutral position corresponding in location to the light emitting element and being located out of the light receiving elements;
wherein the substrate includes a second surface opposite to the first surface provided with the light receiving elements and the light emitting element, the second surface being provided with a plurality of terminals extending in parallel to the rolling plane for surface-mounting;
wherein the inclination sensor further comprises a cover bonded to the case and having a reflection film for reflecting light emitted from the light emitting element toward the light receiving elements.

6. An inclination sensor to be mounted to a target device subjected to inclination detection, the sensor comprising:

a case provided with a vacant space; and a rolling member movably accommodated in the vacant space; the inclination sensor being configured to detect an inclination of the target device based on a positional change of the rolling member within the vacant space due to a change in gravitational direction as the target device is caused to incline, the sensor further comprising:

a substrate mounted to a rear surface of the case, the rear surface being parallel to a rolling plane along which the rolling member is movable, the substrate including a first surface that faces the vacant space and is provided with a pair of light receiving elements spaced from each other and a light emitting element for emitting light to be received by the light receiving elements;

wherein the vacant space of the case is configured to cause the rolling member to be brought to a pair of light shielding positions and a neutral position due to the change in gravitational direction, the light shielding positions corresponding in location to the light receiving elements respectively, and the neutral position corresponding in location to the light emitting element and being located out of the light receiving elements;

wherein the substrate includes a second surface opposite to the first surface provided with the light receiving elements and the light emitting element, the second surface being provided with a plurality of terminals extending in parallel to the rolling plane for surface-mounting;

wherein the inclination sensor further comprises a wiring pattern formed on the first surface of the substrate for bonding the light emitting element and the light receiving elements, the wiring pattern extending to the second surface of the substrate and connected to the terminals for surface mounting.

* * * * *